United States Patent
Feng et al.

(10) Patent No.: US 11,105,425 B2
(45) Date of Patent: Aug. 31, 2021

(54) CHECK VALVE FLAPPER WITH REDUCED MOMENT OF INERTIA AND METHOD OF MAKING

(71) Applicant: Hamilton Sundstrand Corporation, Charlotte, NC (US)

(72) Inventors: Feng Feng, South Windsor, CT (US); Cheryl Chunyu Dou, Farmington, CT (US); James Streeter, Torrington, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 66 days.

(21) Appl. No.: 16/375,985

(22) Filed: Apr. 5, 2019

(65) Prior Publication Data
US 2020/0318743 A1   Oct. 8, 2020

(51) Int. Cl.
*F16K 1/22*   (2006.01)
*F16K 15/03*  (2006.01)

(52) U.S. Cl.
CPC ........... *F16K 1/222* (2013.01); *F16K 15/03* (2013.01); *Y10T 137/7898* (2015.04)

(58) Field of Classification Search
CPC .......... F16K 1/222; F16K 15/03; E21B 34/08; E21B 2200/02; Y10T 137/7898; Y10T 137/7903
USPC ............................... 137/527, 527.8; 166/325
See application file for complete search history.

(56) References Cited

U.S. PATENT DOCUMENTS

| | | | | |
|---|---|---|---|---|
| 194,676 A | * | 8/1877 | Hansen | E03F 7/04 137/409 |
| 199,696 A | * | 1/1878 | Dikeman | E03F 7/04 137/409 |
| 1,897,781 A | * | 2/1933 | Wille | C21B 9/12 137/527.8 |
| 2,176,523 A | * | 10/1939 | Brown | F16K 15/03 137/527.6 |
| 2,310,447 A | * | 2/1943 | Larson | F16K 17/194 137/467 |

(Continued)

FOREIGN PATENT DOCUMENTS

| EP | 2876337 A1 | 5/2015 |
|---|---|---|
| EP | 2913569 A1 | 9/2015 |

(Continued)

OTHER PUBLICATIONS

European Search Report for EP Application No. 19216007.5 dated Jul. 21, 2020.

*Primary Examiner* — Kenneth Rinehart
*Assistant Examiner* — Jonathan J Waddy
(74) *Attorney, Agent, or Firm* — Carlson, Gaskey & Olds, P.C.

(57) ABSTRACT

A check valve includes a valve seat defining an aperture and a seating surface. A flapper is a single homogeneous component having a contact surface and a filler portion. The flapper is pivotally movable relative to the valve seat between a valve closed position in which the contact surface is sealably engaged to the seating surface thereby occluding flow through the aperture, and a valve open position in which the contact surface is a distance from the seating surface. The filler portion has a plurality of voids such that a density of the flapper is lower than if the voids were not present. A method is also disclosed.

17 Claims, 2 Drawing Sheets

(56) References Cited

U.S. PATENT DOCUMENTS

| | | | | |
|---|---|---|---|---|
| 3,825,957 | A | * | 7/1974 | Kaster .................. A61F 2/2406 623/2.24 |
| 3,959,827 | A | * | 6/1976 | Kaster .................. A61F 2/2406 623/2.24 |
| 4,078,268 | A | | 3/1978 | Possis |
| RE30,507 | E | * | 2/1981 | Kaster .................. A61F 2/2406 137/527.4 |
| 5,884,705 | A | * | 3/1999 | Hill, Jr. ................. E21B 34/101 166/324 |
| 2011/0108749 | A1 | * | 5/2011 | Xu .......................... F16K 15/03 251/303 |
| 2013/0340862 | A1 | | 12/2013 | Kamp et al. |
| 2016/0040792 | A1 | | 2/2016 | Kamp et al. |
| 2017/0211712 | A1 | * | 7/2017 | Sabo ....................... F16K 15/03 |
| 2017/0356273 | A1 | | 12/2017 | Bayh, III et al. |
| 2019/0331229 | A1 | * | 10/2019 | McMahon ............. B33Y 10/00 |

FOREIGN PATENT DOCUMENTS

| | | |
|---|---|---|
| EP | 3232101 A1 | 10/2017 |
| GB | 1104759 | 2/1968 |
| RU | 2419014 C2 | 5/2011 |
| WO | 2016/037031 A1 | 3/2016 |
| WO | 2016/133497 A1 | 8/2016 |

\* cited by examiner

CHECK VALVE FLAPPER WITH REDUCED MOMENT OF INERTIA AND METHOD OF MAKING

BACKGROUND

This application relates to a check valve flapper and a method of making such a flapper.

Check valves are known. Typically, a check valve blocks flow of a fluid through a conduit, until a pressure upstream of the valve overcome a downstream pressure. One type of check valve utilizes flapper valves, having a central pivot axis, and a pair of valve plates which seat on the valve seat in the closed position and on the stop in the open position. Another type of check valve utilizes a flapper valve having one pivot axis to one side, and a valve plate which seats on a valve seat.

When the valve opens to allow fluid flow, the movement may be rapid. Further, when the pressure of the fluid is again reduced, such that the flapper valve moves back to a closed position, its movement might be rapid.

The flapper may sometimes contact the valve seat in closing event or contact the stop in an opening event with a high force. This can lead to the valve plate, valve seat or stop being damaged, and eventually, failing.

SUMMARY

A check valve includes a valve seat defining an aperture and a seating surface. A flapper is a single homogeneous component having a contact surface and a filler portion. The flapper is pivotally movable relative to the valve seat between a valve closed position in which the contact surface is sealably engaged to the seating surface thereby occluding flow through the aperture, and a valve open position in which the contact surface is a distance from the seating surface. The filler portion has a plurality of voids such that a density of the flapper is lower than if the voids were not present. A method is also disclosed.

These and other features may be best understood from the following drawings and specification.

DETAILED DESCRIPTION

Figure 1A:
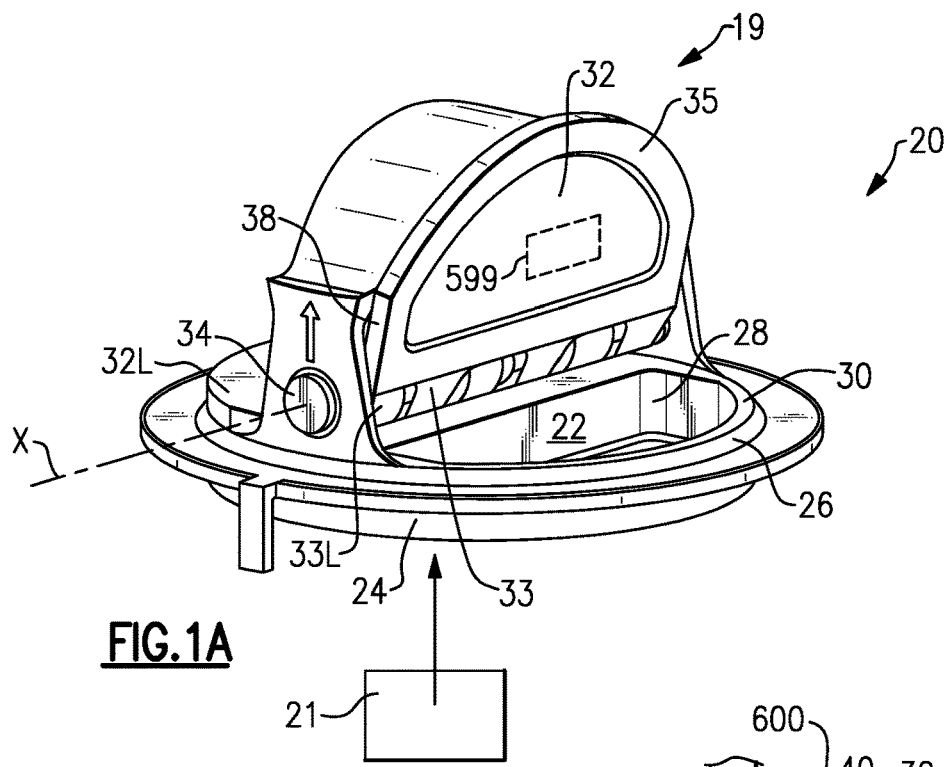
FIG. 1A shows a check valve.

FIG. 1A shows a fluid system 20 including a check valve 19 incorporating a flow passage 22 communicating with a source of fluid 21. A conduit 24 includes a valve seat 26. An aperture 28 extends through the valve seat 26. A flapper valve 32 selectively closes the aperture 28 to block flow of the fluid through the aperture 28. The valve seat 26 and flapper valve 32 could be collectively called a check valve.

Figure 1B:
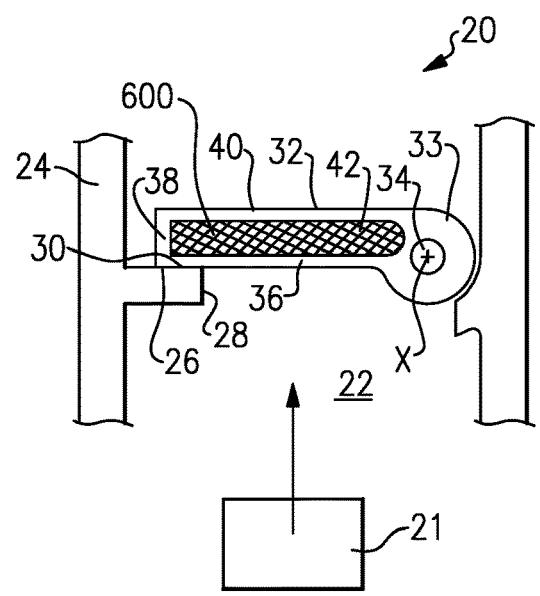
FIG. 1B shows the check valve in a closed position.

The flapper valve 32 pivots on a pin 34. Pin 34 allows the flapper valve 32 to pivot about an axis X. The flapper valve 32, as shown in FIG. 1B, includes a fulcrum 33 pivoting on pivot pin 34. Extending in a direction away from axis X is a valve plate 35 that will contact the valve seat 26 in the closed position. A valve plate 35 will contact a stop 599 (shown in phantom) in the opening position.

Figure 1C:
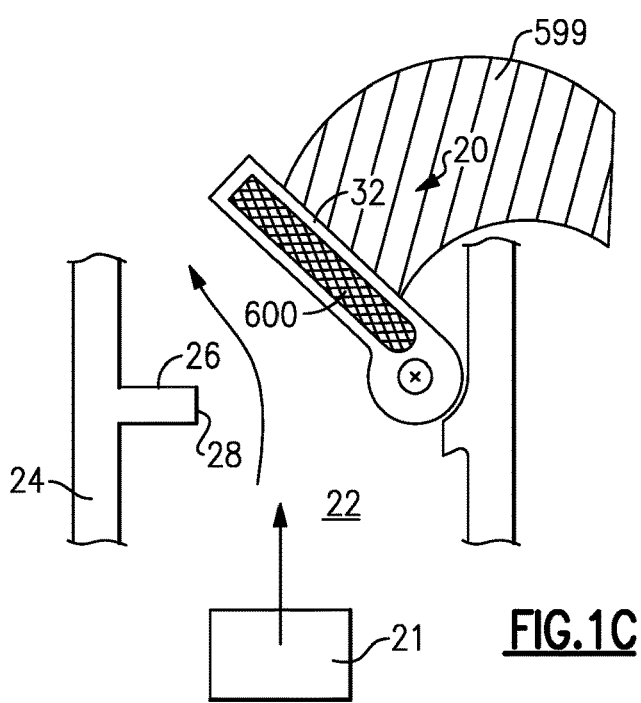
FIG. 1C shows the check valve having moved to an open position.

As mentioned above, one type of check valve 19 includes a pair of flapper valves 32 and 32L. Each have their own fulcrum 33 and 33L pivoting about the pivot pin 34. FIGS. 1B and 1C illustrate a check valve with a single flapper valve 32. It should be understood the teaching with regard to these figures would apply to a dual flapper valve check valve such as valve 19.

FIGS. 1B and 1C schematically show the movement of the flapper valve 32 between a closed position (FIG. 1B) and an open position (FIG. 1C). A contact surface 30 is defined around the edge of an aperture 28 and a contact plate face 36. In the FIG. 1C position flapper valve 32 is shown in contact with stop 599. In this embodiment, the flapper valve 32 is formed of a metal such as Inconel or Aluminum. The contact plate face 36 extends to an outer crossing portion 38 that is connected to a remote plate face 40.

An intermediate matrix or lattice filler portion 42 is formed between the contact plate face 36 and the remote plate face 40.

As shown in FIG. 1C, should the pressure in flow area 22 increase beyond a predetermined amount, the flapper valve 32 will move to an open position contacting stop 599 and causing an impact force and fluid can flow through the aperture 28 to a downstream destination. As mentioned above, when the pressure is again reduced, the flapper valve 32 will pivot back to the FIG. 1B position. When the flapper valve 32 reaches the FIG. 1B position, there will be an impact force at the contact surface 30.

This force is defined by the following equation.

$$F = \frac{I\omega}{tl_0} \quad \text{Equation 1}$$

where I is the moment of inertia of the flapper valve, $\omega$ is an angular velocity of the flapper valve, $l_0$ is the moment arm of the impact force F at the contact surface 30, and t is the time duration of the impact load. A similar force occurs at the contact with stop 599.

$l_0$ is a fixed number once the dimension of the flapper valve and its stop are finalized.

Note the force F is time dependent, not constant. So the force F as shown in equation 1 is an approximate average force over impact time.

Figure 2:
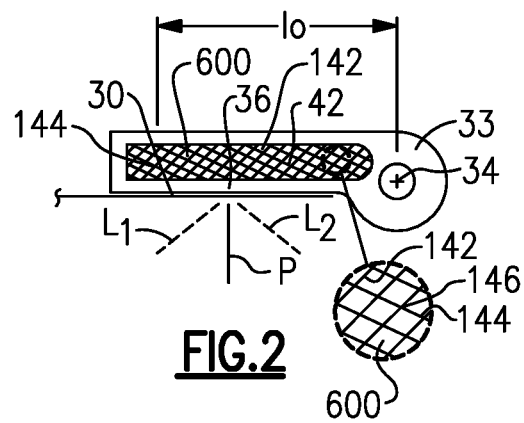
FIG. 2 shows a detail of a first embodiment.

FIG. 2 shows the moment arm $l_0$. The moment of inertia I is related to the effective density and geometry of the flapper valve by the equation below. By including the filler portion 42, the moment of inertia is reduced and, thus, the force is reduced.

$$I = \iiint_V \rho(x,y,z) r^2 dV \quad \text{Equation 2}$$

where $\rho(x,y,z)$ is the effective density at an infinitesimal region within the domain; r is the distance from the infinitesimal region to the rotational axis, V is the entire domain of the investigated flapper.

FIG. 2 shows details of a filler portion 42 embodiment. A number of crossing rails 142 extend in a first direction $L_1$ relative to a perpendicular ray P defined perpendicular to the contact plate face 36.

Other rails 144 extend in a direction $L_2$ which is generally opposed to $L_1$ relative to the ray P. As shown in the exploded section of FIG. 2, the rails 142 and 144 intersect at connectors 146.

The use of the interconnecting rails 142 and 144 provide rigidity to the flapper valve 32 while still significantly reducing its mass. It could be said that the mass of the flapper valve 32 per unit volume at the fulcrum 33 is greater than the mass per unit volume of the flapper valve 32 in a portion of the flapper valve 32 including filler portion. Herein, the density of the filler portion is defined as the mass of the filler portion divided by the bulk volume, which encompasses both the filler material volume and the unfilled volume. The ratio of density between the filler and fulcrum (parent) material is referred to as the relative density ranges from 10-60%. As can be appreciated, this reduces the impact force, due to the lower moment of inertia.

While, the disclosed filler portion 42 has crossing rails 142/144 and intersections 146. However, in some embodiments, a single set of rails may be utilized in place of the intersecting rails.

While the lattice embodiment is disclosed, other shapes such as honeycomb or gyroids may be utilized. Such shapes would include rails, although not the intersections as disclosed above. That is, for purposes of this application a "rail" does not extend only to the illustrated. It also extends to other shapes such as honeycomb, and even to non-linear shapes such as a gyroid.

As shown, there are voids 600 defined intermediate the rails. Returning to FIG. 1A, it can be seen that the crossing portion 38 extends about the circumference of the flapper valve 32. Thus, there are at least some voids 600 which are fluidly isolated from other voids. The plurality of voids results in the flapper valve 32 having a lesser stiffness than a flapper valve with no voids would have.

Figure 3A:
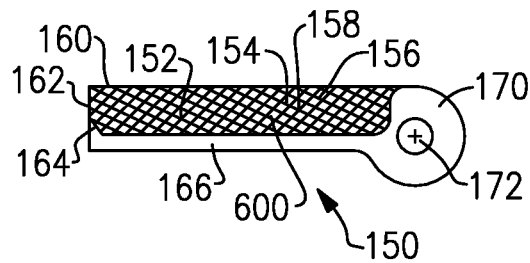
FIG. 3A shows a second embodiment.

As shown in FIG. 3A, another flapper valve embodiment 170 has pivot pin 172 and fulcrum 170. A contact plate face 166 extends to an outer end 164. A filler portion 152 has an outer portion 162 extending from the outer end 164. The remote plate face 40 of the FIG. 1B embodiment is not utilized in this embodiment. Instead, the filler portion 152 extends to a remote face 160 which is generally open. Within the lattice portion 152, there are again rails 154 and 156 intersecting at 158.

Figure 3B:
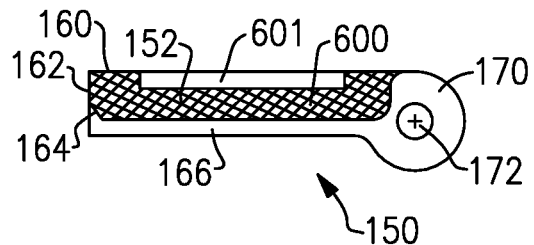
FIG. 3B shows another embodiment.

FIG. 3B shows an embodiment wherein there is a solid portion 601 within the filler portion 152. The solid portion 601 would preferably be aligned with the contact surface with the stop 599.

Figure 4:
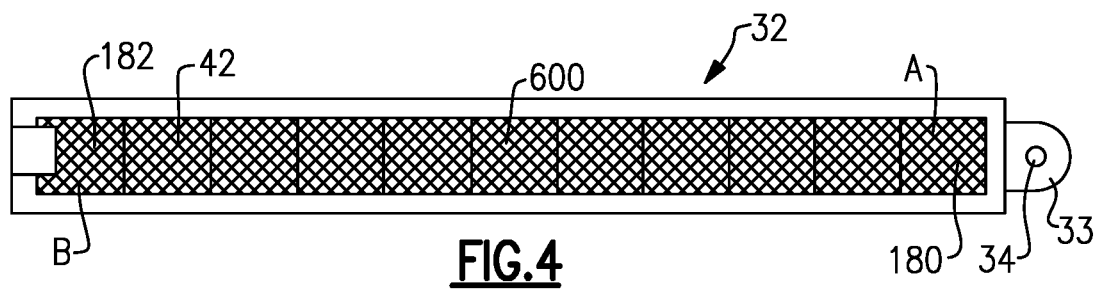
FIG. 4 shows a structural detail somewhat schematically.

FIG. 4 schematically shows a feature, which will be disclosed with regard to the flapper valve 32, but would also apply generally to valve 150. The density of the flapper in a filler portion A is less than the density of the flapper at the fulcrum 33, as explained above. However, the density at area A is also greater than the density at an area B spaced adjacent a remote end 182 spaced from the fulcrum 33. In embodiments, the relative density of adjacent area A might be 60% of density of the fulcrum, while the volume fraction of adjacent area B might be 10-60% of the density of the fulcrum. The density might change linearly between a beginning portion of the filler 180 adjacent the fulcrum 33 and the filler adjacent outer end 182.

A relative density between a density of an inner end section of the filler portion adjacent the fulcrum compared to a density at a section spaced from the inner end is greater than 100% and less than or equal to 600%.

Figure 5:
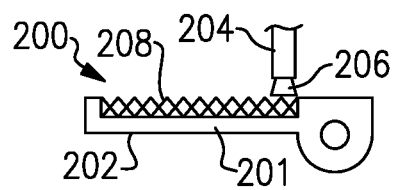
FIG. 5 schematically shows a manufacturing step.

FIG. 5 schematically shows a method 200 for making a flapper valve 201 according to this disclosure. As shown, the contact valve plate face 202 has already been formed by an additive manufacturing device. An additive manufacturing machine 204 is shown depositing material 206 to form lattice structure 208. The use of additive manufacturing, shown here schematically, is beneficial in forming a product such as the flapper valves as disclosed in this disclosure.

The following additive manufacturing techniques might be used: extrusion, photopolymerization, powder bed fusion, binder jetting and material jetting.

A preferred method is powder bed fusion, specifically, selective laser or electron beam melting. In this process, fine powder is fused in a layer by layer fashion to form the desired geometry of a part.

Extrusion deposits filaments, rods or pellet feedstock in a layer wise fashion. Photopolymerization uses light to locally cure a resin possibly containing metal particles. Binder jetting generally uses inkjet technology to trap particles together in the desired part shape. Finally, material jetting deposits a liquid containing metal particles. For metals, a sintering step would be needed to solidify the part.

Of course other techniques may be used.

A check valve 19 could be said to include a valve seat 26 defining an aperture 28 and a seating surface. A flapper valve 32 is a single homogeneous component having a contact surface and a filler portion. The flapper valve is pivotally movable relative to the valve seat between a valve closed position in which the contact surface is sealably engaged to the seating surface thereby occluding flow through the aperture, and a valve open position in which the contact surface is a distance from the seating surface. The filler portion has a plurality of voids 600 such that a density of the flapper is lower than if the voids were not present.

The plurality of voids 600 includes at least one void defines a fluidly sealed volume. The plurality of voids 600 result in the filler portion having a lesser stiffness than a flapper valve without voids.

A method of forming a flapper for a check valve could be said to include depositing material layer by layer to form the flapper as a single homogeneous component having a contact surface and a filler portion.

Notably, the method also extends to forming the flapper valve to have the several details mentioned above.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of forming a flapper for a check valve comprising:
   depositing material layer by layer to form the flapper as a single homogeneous component having a plate face and a filler portion;
   said filler portion has a plurality of voids including at least one void which is fluidly sealed;
   there is a fulcrum;
   a relative density between a density of an inner end section of said filler portion adjacent said fulcrum compared to a density at a section of said filler portion spaced from said inner end section is formed to be greater than 100% and less than or equal to 600%; and
   wherein said density changes linearly between said inner end section of the filler portion to said section of the filler portion spaced from said inner end.

2. The method as set forth in claim 1, wherein said plurality of voids result in said filler portion having a lesser stiffness than if the voids were not present.

3. The method as set forth in claim 1, wherein said filler portion is formed to include a lattice of intersecting sets of rails extending in opposed directions relative to a ray defined perpendicular to said plate face.

4. The method as set forth in claim 3, wherein an end wall is formed to enclose said filler portion at an end of said flapper remote from said fulcrum.

5. The method as set forth in claim 4, wherein a remote plate face is formed on an opposed side of said filler portion from said plate face.

6. The method as set forth in claim 3, wherein there is also a solid material within said filler portion at said opposed side of said filler portion.

7. The method as set forth in claim 1, wherein said density of said section spaced from said inner end section is between 10% and 60% of a density of said fulcrum.

8. A check valve comprising:
a valve seat defining an aperture;
a flapper valve pivoting about a pivot axis defined in a fulcrum, and having a contact plate face extending away from said fulcrum for selectively seating on said valve seat, said contact plate face and said fulcrum being formed of a solid material relative to a filler portion, and said filler portion being formed with at least one set of rails forming voids to reduce the mass of said flapper valve, said filler portion having a density which is less than a density of said fulcrum and said contact plate face;
a relative density between a density of an inner end section of said filler portion adjacent said fulcrum compared to a density of said filler portion at a section spaced from said inner end section is greater than 100% and less than or equal to 600%;
said fulcrum pivoting about a fulcrum pin; and
wherein said density changes linearly between said inner end section of the tiller portion to said section of the filler portion spaced from said inner end.

9. The check valve as set forth in claim 8, wherein said filler portion includes a lattice of intersecting sets of rails extending in opposed directions relative to a ray defined perpendicular to said contact plate face.

10. The check valve as set forth in claim 9, wherein an end wall encloses said filler portion at an end of said flapper valve remote from said fulcrum.

11. The check valve as set forth in claim 10, wherein a remote plate face is formed on an opposed side of said filler portion from said contact plate face.

12. The check valve as set forth in claim 8, wherein said filler portion provides an opposed surface of said flapper valve remote from said contact plate face.

13. The check valve as set forth in claim 12, wherein there is also a solid material within said filler portion at said opposed surface of said flapper valve.

14. The check valve as set forth in claim 8, wherein said density of said section spaced from said inner end section is between 10% and 60% of said density of said fulcrum.

15. The check valve as set forth in claim 14, wherein said density of said inner end section of said filler portion adjacent said fulcrum is 60% of the density of the fulcrum.

16. A method of forming a flapper tor a chock valve comprising:
depositing material layer by layer to form the flapper as a single homogeneous component having a plate face and a filler portion;
said filler portion has a plurality of voids including at least one void which is fluidly sealed;
there is a fulcrum;
a relative density between a density of an inner end section of said filler portion adjacent said fulcrum compared to a density at a section of said filter portion spaced from said inner end section is formed to be greater than 100% and less than or equal to 600%;
said density of said section spaced from said inner end section is between 10% and 60% of a density of said fulcrum; and
wherein said density of said inner end section of said filler portion adjacent said fulcrum is 60% of the density of the fulcrum.

17. The method as set forth in claim 16, wherein said density changes linearly between said inner end section of the filler portion to said section of the filler portion spaced from said inner end.

* * * * *